United States Patent [19]

Skinner

[11] 4,222,594
[45] Sep. 16, 1980

[54] SWIVEL COUPLINGS

[75] Inventor: Harcourt J. Skinner, Weston, Canada

[73] Assignee: Daymond Limited, Mississauga, Canada

[21] Appl. No.: 923,144

[22] Filed: Jul. 10, 1978

[51] Int. Cl.² ............................................. F16L 27/00
[52] U.S. Cl. ..................................... 285/280; 285/401; 285/423; 285/DIG. 4
[58] Field of Search ................. 285/DIG. 4, 272, 280, 285/278, 5, 6, 7, 355, 376, 390, 391, 401, 423, 424, 98, 281, 209, 360, 134, 361, 98, 122, 275, 168, 359, 395, 396, 402; 403/343, 348, 349, 164, 165

[56] References Cited
U.S. PATENT DOCUMENTS

| | | | |
|---|---|---|---|
| 1,729,483 | 9/1929 | Koch | 285/280 X |
| 3,650,551 | 3/1972 | Akers | 285/209 X |
| 3,785,682 | 1/1974 | Schaller | 285/DIG. 4 |
| 3,899,198 | 8/1975 | Maroschak | 285/DIG. 4 |
| 4,050,721 | 9/1977 | Streit | 285/355 X |
| 4,060,264 | 11/1977 | Gajajiva | 285/340 X |

Primary Examiner—Dave W. Arola
Attorney, Agent, or Firm—Ivor M. Hughes

[57] ABSTRACT

Means to form a coupling between lengths of pipe, a male component having at least one annular rib on the outer surface of the male component and a female component having at least one annular groove corresponding in number to the number of annular ribs, one for each rib, to accommodate the at least one annular rib when the coupling is made to permit free rotation of the at least one annular rib in the at least annular groove when the coupling is made, and means to facilitate the entry of the rib into the groove, said means comprising at least one groove or slot corresponding in number to the number of annular ribs disposed at an angle between about 65° and about 80° to the longitudinal axis intersecting the at least one annular groove.

30 Claims, 8 Drawing Figures

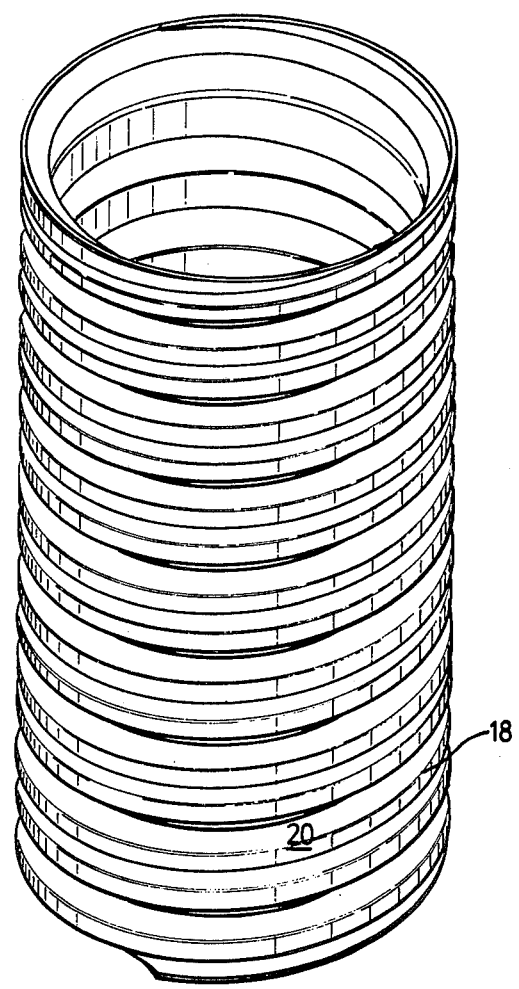
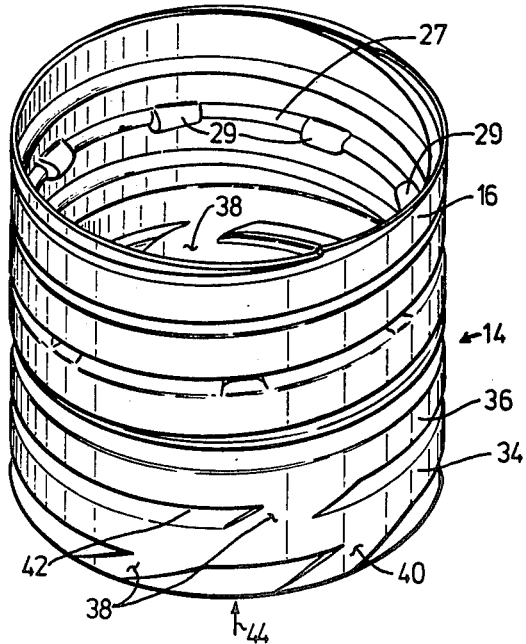
FIG. 2.

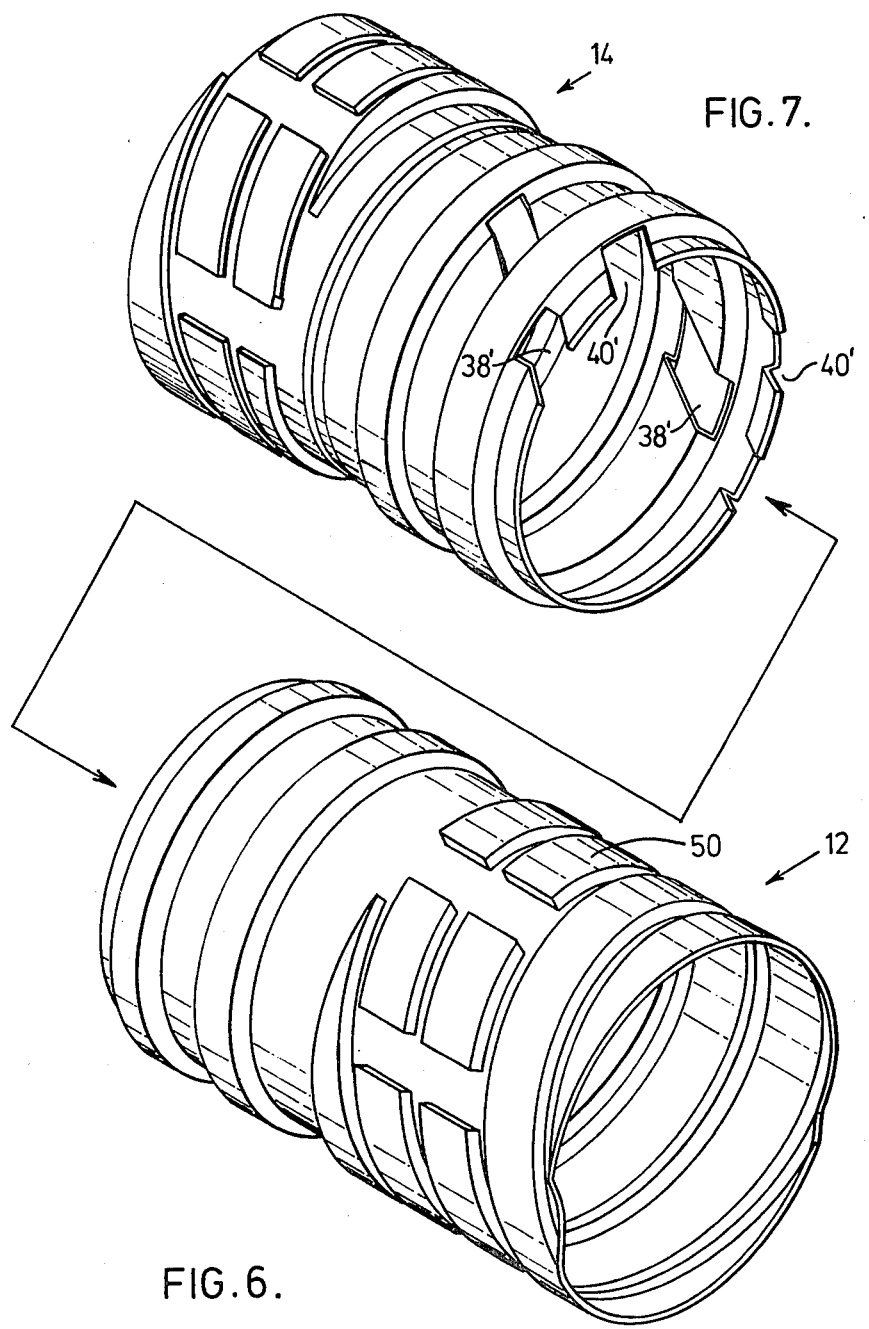

SWIVEL COUPLINGS

FIELD OF INVENTION

This invention relates to pipe joints and couplings and finds particular application in freely rotating (swivel) pipe couplings for agricultural drainage pipe.

BACKGROUND OF THE INVENTION

Corrugated plastic pipe, in for example 250 foot lengths is widely used for the drainage of agricultural lands, joined lengths of pipe, being buried in a grid pattern and extending thousands of feet under the plot of land to be drained. Joining the lengths of pipe has, however, presented a problem. In view of the stresses in the individual lengths of pipe, a freely rotating (swivel) coupling is preferably so that the stresses in one pipe are not transmitted to the pipe to which it is coupled. For free rotation, the coupling provides at least one annular rib projecting radially outwardly from the outer surface of a male component, and a like number of annular grooves formed to extend radially outwardly from the inner surface of the female component. When the lengths of pipe are joined, the rib swivels in the annular groove, and is retained therein because the at least one annular rib has a greater diameter than the inner surface wall of the female component. In this manner, any twisting of one pipe in the chain causes the one component to freely rotate with respect to the other component, thereby minimizing the effect on the total length of pipe joined.

While this coupling is very effective in achieving the desired result, the joining of the components to provide this end coupling is very difficult. Pushing the two components axially together is not very feasible, because of the relative dimensions of the annular rib and inner surface wall of the female components.

In the past, the female component of the coupling was cut and opened, the male component positioned in the female component and the female component wrapped securely around the male component so that each annular rib projects into the groove. The two components were then tied together with wire. The results however, were not completely satisfactory since the cutting and tying procedure requiring additional labour, and through years of burial in the ground, the wire tended to corrode and the joint weakened.

It is therefore, an object of this invention to provide a more satisfactory coupling which eliminates the need for cutting and reduces the stress of coupling the components together, while at the same time, provides for maximum coupling effectiveness.

Further and other objects of the invention will be realized by those skilled in the art from the following summary of the invention and detailed description of the preferred embodiments thereof.

SUMMARY OF THE INVENTION

This invention makes use of two movements of the male and female components for forming the coupling, a positioning of a portion of the male component adjacent its mouth, within the mouth of the female component at an angle thereto (as for example, by partially threading the male component into the female component) so that the longitudinal axes of the components are angled relative to one another, and, a swinging motion to bring the longitudinal axis of the male and female components into axial alignment, while at the same time, pushing the two components axially together until the coupling is formed.

In this regard, and according to the invention, the male component includes at least one annular rib and preferably two, parallel to, and spaced from one another, situate on the outer surface and the female component includes at least one annular groove (corresponding in number to the annular ribs, one for each rib) directed radially outwardly to accommodate the at least one annular rib when the coupling is made to permit free rotation of the at least one annular rib in the at least one annular groove, and means facilitating the entry of the at least one annular rib into the at least annular groove to form the coupling.

According to one aspect of the invention, the means facilitating entry comprises at least one slot or groove (the number depending on the number of ribs) preferably curved and preferably being a curved arcuate portion of an ellipse angled relative to the at least one annular groove to accommodate a portion of the at least one annular rib, when the male and female components are positioned so that their longitudinal axes are angled relative to another. In this regard, the at least one slot or groove is constructed to be of such length in the female portion so as to permit the at least one annular rib to be threaded therealong until a substantial portion of the male component adjacent its mouth is within the opening of the female component and a portion of each annular rib is in a portion of an annular groove. Where more than one groove or slot is provided, they are substantially parallel to one another, adjacent grooves or slots, separated a predetermined distance equal to the vertical distance between the annular ribs when the male component is angled relative to the female component whose longitudinal axis is (for discussion purposes) maintained horizontally. Preferably the angle formed between the means facilitating entry, and annular grooves is between about 65° and about 80° to the longitudinal axis of the female component.

In use, the male component of the coupling is positioned within the female component so that the at least one annular rib is angled between about 80° and about 65° to the longitudinal axis of the female component so that the at least one annular rib is positioned in at least one slot or groove provided to facilitate its entry as for example, by a screwing or threading motion in the groove. Thereafter, an inward pressure and swinging motion drives the at least one annular rib into the at least one annular groove where it is locked into position.

Preferably and where a less resilient material is used in the construction of the male and female components, according to another aspect of the invention the means facilitating entry comprises two sets of curved slots or grooves (the number of slots or grooves in each set depending upon the number of ribs) each set angled to the at least one annular groove, the first set preferably angled between about +65° and about +80° to the longitudinal axis of the female component and the second set positioned adjacent to and spaced from the first set and angled away therefrom at an angle preferably between about −65° and about −80° to the longitudinal axis. Each set of grooves or slots is constructed as previously described. For example, where one annular rib is situated on the male component, each set of grooves or slots numbers one groove or slot of such length so as to permit the rib of the angled male component to be threaded into one of the grooves. As the rib penetrates further into the groove or slot a portion of the rib lies in and penetrates the other groove or slot so that when the components are swung and pushed into axial alignment, the portions of the ribs in the grooves or slots deflect the wall of the female component between the annular groove and slot or groove to assist the rib portions not in any annular groove or slot to be driven into the annular groove.

According to another aspect of the invention, entry ramps may be provided between each annular groove and the mouth of the female component to facilitate the entry of each annular rib into each groove with the longitudinal axis of the female component. Preferably, each annular rib includes a ramp on the side of the rib closest the mouth of the male component sloping in a direction radially outwardly away from the male component to a wall which falls sharply from the ramp to the surface of the male component.

For economic purposes, manufacture of the couplings is preferably performed separately from the manufacture of the drainage pipe. Therefore, when the coupling is manufactured the male and female components include on their ends, means to be secured to the lengths of pipe to be joined, as for example, spiraling grooves to accommodate spiraling threading on the ends of the corrugated pipe.

The components are preferably made of high density polyethylene or polypropylene which are strong and resilient and are preferably continuously moulded for example, by employing continuous blow forming, or continuous vacuum forming, techniques.

BRIEF DESCRIPTION OF THE PREFERRED EMBODIMENTS OF THE INVENTION

FIG. 2 is a perspective view of the female component of a coupling to be secured to a corrugated pipe according to a first preferred embodiment of the invention;

FIG. 6 is a perspective view of a male component of a coupling according to a second preferred embodiment of the invention;

FIG. 7 is a perspective view of a female component of a coupling according to the second preferred embodiment of the invention;

DETAILED DESCRIPTION OF THE PREFERRED EMBODIMENTS OF THE INVENTION

Figure 1:
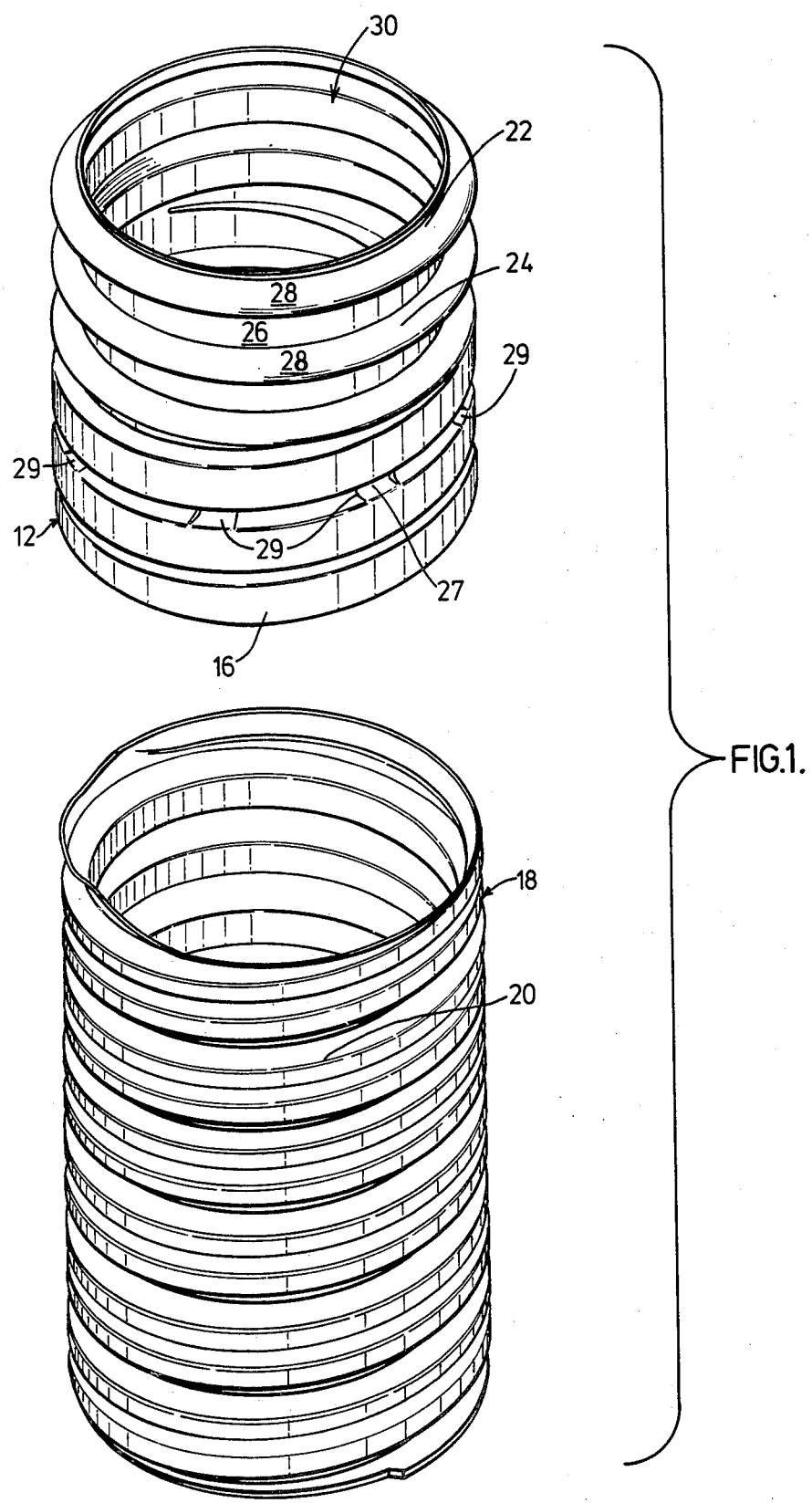
FIG. 1 is a perspective view of the male component of a coupling to be secured to a corrugated pipe, according to a first preferred embodiment of the invention.

With reference to FIGS. 1 to 5 inclusive, there is shown coupling 10 (See FIG. 5) formed between male component 12 (See FIGS. 1, 4 and 5) and female component 14 (See FIGS. 2, 3, 4, and 5).

Male component 12 includes on one end, spiral grooves 16 for screwing onto corrugated pipe 18 having spiral threading 20 of lesser diameter than male component 12 and on the other end two annular ribs 22 and 24 separated a predetermined distance on the outer surface 26 of male component 12. Separating surface 26 from spiral grooves 16 is locking ring or stop 27 having spaced projections 29, to stop threading 20 from penetrating male component 12 any further when corrugated pipe 18 is secured to male component 12.

Each of ribs 22 and 24 includes an inclined ramp 28 sloping radially outwardly from surface 26 and away from mouth 30 of male component 12. At its maximum outward extent, ramp 28 terminates abruptly and falls radially outwardly to surface 26 forming wall 32.

Figure 3:
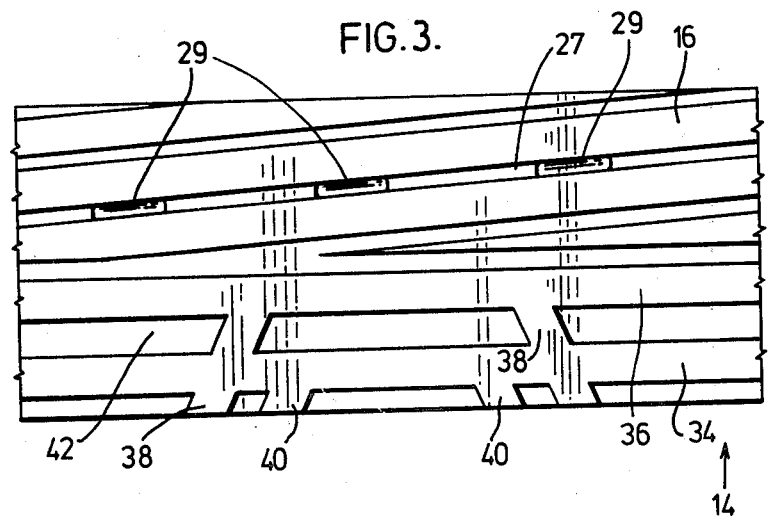
FIG. 3 is a close-up view in plan of part of the female component of FIG. 2 slit longitudinally and laid flat.
Figure 5:
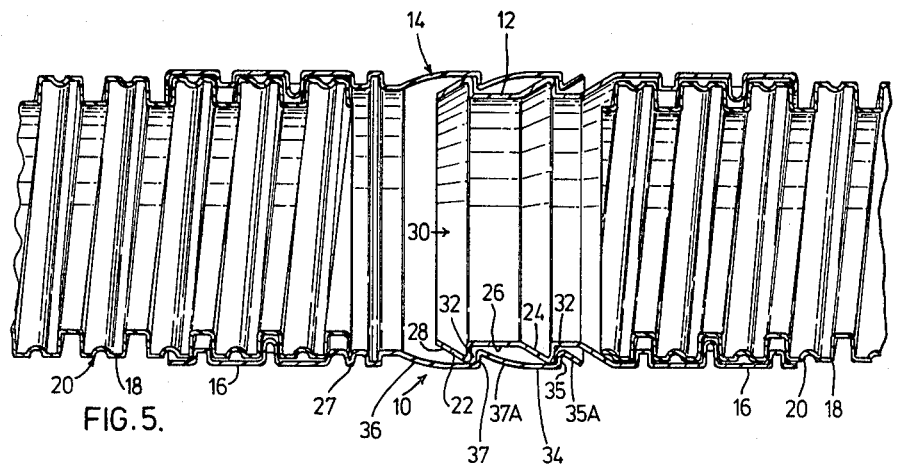
FIG. 5 is a cross-sectional view of the coupling formed by the male and female components according to the first embodiment of the invention.

Female component 14 includes on one end spiral grooves 16 for screwing into corrugated pipe 18 having spiral threading 20 of lesser diameter than female component 14 and on the other end, annular grooves 34 and 36 having front walls 35 and 37 respectively and entry ramps 35A and 37A leading into grooves 34 and 36 and one set of curved grooves 38 and 40 being curved arcuate portions of an ellipse (See FIG. 2), angled +25° relative to, and adjacent to, grooves 34 and 36 disposed on the outer surface 42 (+65° to the longitudinal axis of the female component) and a second set of curved grooves 38 and 40 angled −25° relative to grooves 34 and 36 (−65° to the longitudinal axis of the female component (See FIG. 3).

Separating, surface 42, grooves 34 and 36, and grooves 38 and 40, from spiraling grooves 16 is locking ring or stop 27 (identical to that, and for the same purposes as locking ring 27, in male component 12) having spaced projections 20. Each of grooves 38 extends from mouth 44 of female component 14 angularly ±25° along surface 42 to intersect both annular grooves 34 and 36 while each of grooves 40 extends only from mouth 44 angularly ±25° along surface 42 to intersect annular groove 34. Adjacent parallel grooves 38 and 40 are separated a predetermined distance as will be discussed hereinafter.

Figure 4:
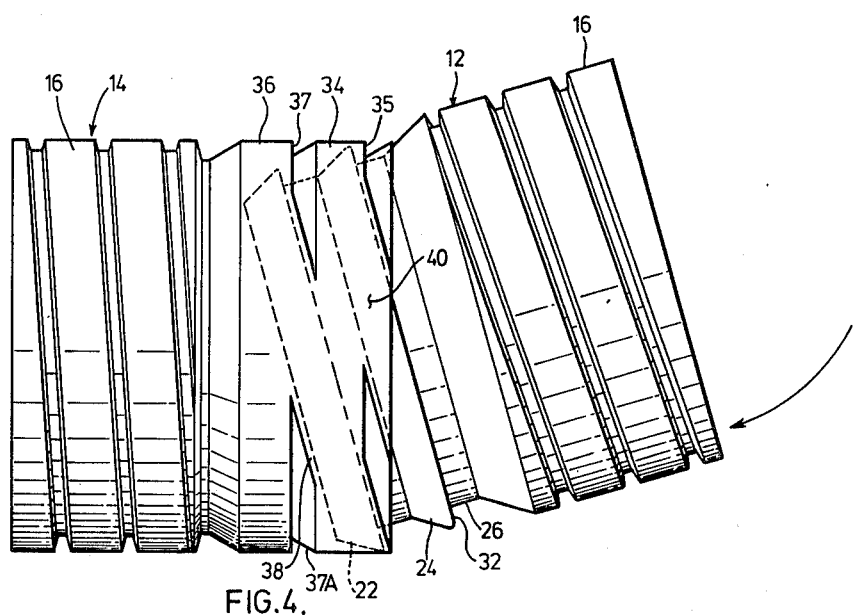
FIG. 4 is a side view of the male and female components initially positioned for forming the coupling according to the first embodiment of the invention.

Coupling 10 is formed by inserting male component 12 into female component 14 as follows:

With reference to FIG. 4, male component 12 is brought at an angle to mouth 44 of female component 14 to position annular ribs 22 and 24 in angled grooves 38 and 40 respectively.

In this regard, annular rib 22 is inserted at the entrance of grooves 38 angled at +25° and both components rotated about their longitudinal axis of symmetry, thereby feeding rib 22 further into groove 38 and feeding rib 24 into adjacent groove 40 angled at +25°. The feeding of rib 24 into groove 40 requires the vertical distance "d" between groove 38 and 40 to be equal to the vertical distance "d" between ribs 22 and 24 when male component 12 is angularly inserted into female component 14, (which for discussion purposes is shown as horizontally disposed). As will be appreciated, this distance will vary in other embodiments as the angle of presentation of the components 12 and 14 varies.

After portions of ribs 22 and 24 have been positioned within grooves 38 and 40 respectively, as described, portion of ribs 22 and 24 begin to enter or are positioned adjacent to grooves 38 and 40 (angled −25°). The longitudinal axis of the male component 12 is then swung into alignment with the longitudinal axis of female component 14 while at the same time the components are pushed together. Because portions of ribs 22 and 24 are already in grooves 36 and 34 respectively (See FIG. 4), entry is facilitated. As male component is swung into alignment and inwardly directed longitudinal force applied, ramps 28 or ribs 22 and 24 ride up entry ramps 37A and 35A respectively deforming slightly and snap into grooves 36 and 34 respectively, so that walls 32 or ribs 22 and 24 are positioned behind walls 37 and 35 respectively locking annular ribs 22 and 24 within grooves 36 and 34 respectively.

Figure 8:
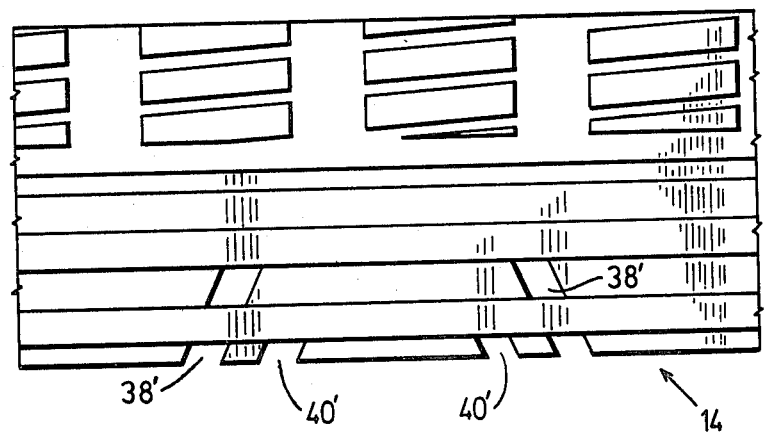
FIG. 8 (found in FIG. 3) is a close-up view in plan of part of the female component of FIG. 7 slit longitudinally and laid flat.

With reference to the embodiment shown in FIGS. 6, 7 and 8, male component 21 has been modified only insofar as the locking ring is concerned. In this case annularly disposed interrupted ring configuration 50 is provided to act in the same manner as locking ring 27. Female component 14 also has been modified to provide curved slots $38^1$ and $40^1$ as opposed to grooves 38 and 40 which slots act in the same manner, facilitating the entry of a portion of ribs 22 and 24 into slots $38^1$ and $40^1$ respectively prior to swinging male and female components into axial alignment and pushing them together.

As many changes could be made to the preferred embodiments of the invention without departing from the scope of the invention, it is intended that all matter contained herein be interpreted as illustrative of the invention and not in a limiting sense.

The embodiments of the invention in which an exclusive property or privilege is claimed are as follows:

1. For use to form a coupling between lengths of pipe, a male component having at least one annular rib on the outer surface of the male component and a female component having at least one annular groove corresponding in number to the number of annular ribs, one for each rib, to accommodate the at least one annular rib when the coupling is made to permit free rotation of the at least one annular rib in the at least annular groove when the coupling is made, and means to facilitate the entry of the rib into the groove, said means comprising at least one groove or slot corresponding in number to the number of annular ribs disposed at an angle between about 65° and about 80° to the longitudinal axis intersecting the at least one annular groove.

2. The combination of claim 1, wherein the at least one annular groove comprises two spaced grooves, the at least one annular rib comprises two spaced annular ribs, and said means comprises two parallely spaced grooves or slots, one of the grooves or slots intersecting both annular grooves and the other groove intersecting at least the annular groove nearest the mouth of the female component.

3. The combination of claim 1 or 2 wherein each annular rib includes a ramp sloping from the mouth of the male component radially outwardly away from the mouth and dropping steeply at its outer extremity to the surface of the male component and each annular groove includes an inclined entry ramp sloping radially inwardly in a direction away from the mouth of the female component on the side of the groove nearest the mouth of the female component, said ramp at its minimum radial extent dropping steeply into said groove thus forming a retaining wall.

4. The combination of claim 1 or 2 wherein the components are manufactured from high density polyethylene or polypropylene by continuous moulding techniques.

5. The combination of claim 1 or 2 wherein means are secured to the male and female components to permit their securing to lengths of pipe.

6. For use to form a coupling between lengths of pipe, a male component having at least one annular rib on the outer surface of the male component and a female component having at least one annular groove corresponding in number to the number of annular ribs, one for each rib, to accommodate the at least one annular rib when the coupling is made to permit free rotation of the at least one annular rib in the at least annular groove when the coupling is made, and means to facilitate the entry of the rib into the groove, said means comprising two sets of slots or grooves (the number of slots or grooves in each set corresponding to the number of ribs) each set angled relative to the at least one annular groove, the first set preferably angled between about +65° and about +80° to the longitudinal axis of the female component and the second set positioned adjacent to and spaced from the first set and angled away therefrom at an angle between about −65° and about −80° to the longitudinal axis, the sets of grooves being spaced to permit the at least one annular rib when fed into the at least one angled groove or slot of one of the sets of grooves or slots to be received in the other at least one angled groove or slot of the other set of grooves or slots.

7. The combination of claim 6, wherein the at least one annular groove comprises two spaced grooves, the at least one annular rib comprises two spaced annular ribs, and each of said sets of slots or grooves comprises two parallely spaced grooves or slots, one of the grooves or slots of each set intersecting both annular grooves and the other groove of each set intersecting at least the annular groove nearest the mouth of the female component.

8. The combination of claim 6 or 7 wherein each annular rib includes a ramp sloping from the mouth of the male component radially outwardly away from the mouth and dropping steeply at its outer extremity to the surface of the male component and each annular groove includes an inclined entry ramp sloping radially outwardly in a direction away from the mouth of the female component on the side of the groove nearest the mouth of the female component said ramp at its minimum radial extent dropping steeply into said groove thus forming a retaining wall.

9. The combination of claim 6 or 7 wherein the components are manufactured from high density polyethylene or polypropylene by continuous moulding techniques.

10. The combination of claim 6 or 7 wherein means are secured to the male and female components to permit their securing to lengths of pipe.

11. For use to form a coupling between lengths of pipe, a male component having at least one annular rib on the outer surface of the male component and a female component having at least one annular groove corresponding in number to the number of annular ribs, one for each rib, to accommodate the at least one annular rib when the coupling is made to permit free rotation of the at least one annular rib in the at least annular groove when the coupling is made, and means to facilitate the entry of the rib into the groove, said means comprising at least one curved groove or curved slot corresponding in number to the number of annular ribs disposed at an angle between about 65° and about 80° to the longitudinal axis intersecting the at least one annular groove.

12. The combination of claim 11, wherein the at least one annular groove comprises two spaced grooves, the at least one annular rib comprises two spaced annular ribs, and said means comprises two parallely spaced curved grooves or slots, one of the curved grooves or slots intersecting both annular grooves and the other curved groove intersecting at least the annular groove nearest the mouth of the female component.

13. The combination of claim 11 or 12, wherein each annular rib includes a ramp sloping from the mouth of the male component radially outwardly away from the mouth and dropping steeply at its outer extremity to the surface of the male component and each annular groove includes an inclined entry ramp sloping radially inwardly in a direction away from the mouth of the female component on the side of the groove nearest the mouth of the female component, said ramp at its minimum radial extent dropping steeply into said groove thus forming a retaining wall.

14. The combination of claim 11 or 12, wherein the components are manufactured from high density polyethylene or polypropylene by continuous moulding techniques.

15. The combination of claims 11 or 12, wherein means are secured to the male and female components to permit their securing to lengths of pipe.

16. For use to form a coupling between lengths of pipe, a male component having at least one annular rib on the outer surface of the male component and a female component having at least one annular groove corresponding in number to the number of annular ribs, one for each rib, to accommodate the at least one annular rib when the coupling is made to permit free rotation of the at least one annular rib in the at least annular groove when the coupling is made, and means to facilitate the entry of the rib into the groove, said means comprising two sets of curved slots or grooves (the number of slots or grooves in each set corresponding to the number of ribs) each set angled relative to the at least one annular groove, the first set preferably angled between about +65° and about +80° to the longitudinal axis of the female component and the second set positioned adjacent to and spaced from the first set and angled away therefrom at an angle between about −65° and about −80° to the longitudinal axis, the sets of grooves being spaced to permit the at least one annular rib when fed into the at least one angled groove or slot of one of the sets of grooves or slots to be received in the other at least one angled groove or slot of the other set of grooves or slots.

17. The combination of claim 16, wherein the at least one annular groove comprises two spaced grooves, the at least one annular rib comprises two spaced annular ribs, and each of said sets of curved slots or grooves comprises two parallely spaced curved grooves or slots, one of the curved grooves or slots of each set intersecting both annular grooves and the other curved groove of each set intersecting at least the annular groove nearest the mouth of the female component.

18. The combination of claim 16 or 17, wherein each annular rib includes a ramp sloping from the mouth of the male component radially outwardly away from the mouth and dropping steeply at its outer extremity to the surface of the male component and each annular groove includes an inclined entry ramp sloping radially outwardly in a direction away from the mouth of the female component on the side of the groove nearest the mouth of the female component said ramp at its minimum radial extent dropping steeply into said groove thus forming a retaining wall.

19. The combination of claim 16 or 17 wherein the components are manufactured from high density polyethylene or polypropylene by continuous moulding techniques.

20. The combination of claim 16 or 17, wherein means are secured to the male and female components to permit their securing to lengths of pipe.

21. For use to form a coupling between lengths of pipe, a male component having at least one annular rib on the outer surface of the male component and a female component having at least one annular groove corresponding in number to the number of annular ribs, one for each rib, to accommodate the at least one annular rib when the coupling is made to permit free rotation of the at least one annular rib in the at least annular groove when the coupling is made, and means to facilitate the entry of the rib into the groove, said means comprising at least one groove or slot being a curved arcuate portion of an ellipse, corresponding in number to the number of annular ribs disposed at an angle between about 65° and about 80° to the longitudinal axis intersecting the at least one annular groove.

22. The combination of claim 21, wherein the at least one annular groove comprises two spaced grooves, the at least one annular rib comprises two spaced annular ribs, and said means comprising two parallely spaced grooves or slots being curved arcuate portions of an ellipse, one of said grooves or slots intersecting both annular grooves and the other intersecting at least the annular groove nearest the mouth of the female component.

23. The combination of claim 21 or 22, wherein each annular rib includes a ramp sloping from the mouth of the male component radially outwardly from the mouth and dropping steeply at its outer extremity to the surface of the male component and each annular groove includes an inclined entry ramp sloping radially inwardly in a direction away from the mouth of the female component on the side of the groove nearest the mouth of the female component, said ramp at its minimum radial extent dropping steeply into said groove thus forming a retaining wall.

24. The combination of claims 21 or 22, wherein the components are manufactured from high density polyethylene or polypropylene by continuous moulding techniques.

25. The combination of claims 21 or 22, wherein means are secured to the male and female components to permit their securing to lengths of pipe.

26. For use to form a coupling between lengths of pipe, a male component having at least one annular rib on the outer surface of the male component and a female component having at least one annular groove corresponding in number to the number of annular ribs, one for each rib to accommodate the at least one annular rib when the coupling is made to permit free rotation of the at least one annular rib in the at least annular groove when the coupling is made, and means to facilitate the entry of the rib into the groove, said means comprising two sets of grooves or slots being curved arcuate portions of an ellipse (the number of slots or grooves in each set corresponding to the number of ribs) each set angled relative to the at least one annular groove, the first set preferably angled between about +65° and about +80° to the longitudinal axis of the female component and the second set positioned adjacent to and spaced from the first set and angled away therefrom at an angle between about −65° and about −80°0 to the longitudinal axis, the sets of grooves being spaced to permit the at least one annular rib when fed into the at least one angled groove or slot or one of the sets of grooves or slots to be received in the other at least one angled groove or slot of the other set of grooves or slots.

27. The combination of claim 26, wherein the at least one annular groove comprises two spaced grooves, the at least one annular rib comprises two spaced annular ribs, and each of said sets of grooves or slots being curved arcuate portions of an ellipse, comprises two parallely spaced grooves or slots being curved arcuate portions of an ellipse, one of the said grooves or slots of each set intersecting both annular grooves and the other said groove or slot intersecting at least the annular groove nearest the mouth of the female component.

28. The combination of claim 26 or 27, wherein each annular rib includes a ramp sloping from the mouth of the male component radially outwardly away from the mouth and dropping steeply at its outer extremity to the surface of the male component and each annular grooves includes an inclined entry ramp sloping radially outwardly in a direction away from the mouth of the female component on the side of the groove nearest the mouth of the female component said ramp at its minimum radial extent dropping steeply into said groove thus forming a retaining wall.

29. The combination of claims 26 or 27, wherein the components are manufactured from high density polyethylene or polypropylene by continuous moulding techniques.

30. The combination of claims 26 or 27, wherein means are secured to the male and female components to permit their securing to lengths of pipe.

* * * * *